(12) United States Patent
Wong et al.

(10) Patent No.: US 12,215,618 B2
(45) Date of Patent: Feb. 4, 2025

(54) FILTERS FOR COOLING APPARATUS

(71) Applicant: Perkins Engines Company Limited, Peterborough (GB)

(72) Inventors: Wing Ngai Wong, Peterborough (GB); Siddharth Subhash Gharpure, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 18/437,940

(22) Filed: Feb. 9, 2024

(65) Prior Publication Data

US 2024/0271558 A1     Aug. 15, 2024

(30) Foreign Application Priority Data

Feb. 10, 2023    (GB) ...................................... 2301889

(51) Int. Cl.
    *F01P 11/02*       (2006.01)
    *B01D 29/11*       (2006.01)
    (Continued)

(52) U.S. Cl.
    CPC ............ *F01P 11/02* (2013.01); *B01D 29/114* (2013.01); *B01D 35/027* (2013.01);
    (Continued)

(58) Field of Classification Search
    CPC .... F01P 11/02; F01P 11/06; F01P 7/14; F01P 2007/146; F01P 2011/061; B01D 29/114;
    (Continued)

(56) References Cited

U.S. PATENT DOCUMENTS

| 4,343,353 A | 8/1982 | Tsopelas | |
|---|---|---|---|
| 6,360,559 B1 * | 3/2002 | Midorikawa | ...... H05K 7/20272 361/689 |

(Continued)

FOREIGN PATENT DOCUMENTS

| EP | 2065578 A1 | 6/2009 | |
|---|---|---|---|
| GB | 2512385 B | 10/2014 | |
| WO | WO-8606002 A * | 10/1986 | ............. B01D 29/27 |

OTHER PUBLICATIONS

Great Britain search report related to Application No. 2301889.8; reported on Jul. 14, 2023.
European Search Report for EP Patent Appln. No. 24153535.0, mailed Jul. 15, 2024 (3 pgs).

*Primary Examiner* — Kenneth J Hansen
*Assistant Examiner* — Kelsey L Stanek

(57) ABSTRACT

A cooling apparatus for an engine comprising: a) a coolant reservoir comprising a coolant line outlet port; b) a tank for holding an aqueous urea solution for injection into an exhaust system of the engine; c) a coolant line for transferring a coolant fluid discharged from the coolant reservoir via the coolant line outlet port to the tank to enable, in use, heat exchange between the coolant fluid and the aqueous urea solution contained in the tank; d) a coolant control valve located on the coolant line for controlling flow of coolant fluid along the coolant line to the tank; and e) a filter for filtering the coolant fluid being discharged via the coolant line outlet port; wherein the filter comprises a filtering portion that is located within an interior of the coolant reservoir so that the coolant fluid is filtered within the coolant reservoir before the coolant fluid enters the coolant line.

20 Claims, 4 Drawing Sheets

(51) Int. Cl.
*B01D 35/027* (2006.01)
*F01N 3/20* (2006.01)
*F01P 7/14* (2006.01)
*F01P 11/06* (2006.01)

(52) U.S. Cl.
CPC .............. *F01N 3/2066* (2013.01); *F01P 7/14* (2013.01); *F01P 11/06* (2013.01); *F01N 2610/02* (2013.01); *F01N 2610/1406* (2013.01); *F01P 2007/146* (2013.01); *F01P 2011/061* (2013.01)

(58) Field of Classification Search
CPC ..... B01D 35/027; F01N 3/2066; F01N 3/037; F01N 2610/02; F01N 2610/1406; F01N 2610/105; F01N 2610/1433; F01N 2610/1486; F01N 2240/02; F01N 2240/06; F01N 2900/1811; F28D 7/024
USPC ......................................................... 60/282
See application file for complete search history.

(56) References Cited

U.S. PATENT DOCUMENTS

| | | |
|---|---|---|
| 9,131,667 B2 | 9/2015 | Carew |
| 9,581,074 B2 | 2/2017 | Harkey |
| 11,224,830 B2 | 1/2022 | Wildermuth |
| 2007/0221554 A1 | 9/2007 | Wright |
| 2010/0132817 A1* | 6/2010 | Hewkin ............... B01D 35/027 137/544 |
| 2013/0269321 A1* | 10/2013 | Watanabe ............... F01N 3/208 60/287 |
| 2015/0219003 A1* | 8/2015 | Hurst ..................... F01P 5/12 123/41.47 |
| 2015/0275732 A1* | 10/2015 | Yi .......................... F01N 3/2046 165/96 |
| 2016/0090894 A1 | 3/2016 | Sato et al. |
| 2020/0149463 A1 | 5/2020 | Trythall et al. |
| 2021/0380213 A1 | 12/2021 | Watanabe et al. |
| 2022/0226758 A1* | 7/2022 | Bossini ................. B01D 35/02 |

* cited by examiner

FILTERS FOR COOLING APPARATUS

TECHNICAL FIELD

The present disclosure relates to filters for a cooling apparatus, cooling apparatus comprising such filters and methods of protecting a coolant control valve of an engine from contaminants.

BACKGROUND TO THE DISCLOSURE

It is known to provide diesel internal combustion engines with a source of diesel exhaust fluid (DEF) for injection into the exhaust system during operation. Typically, the DEF comprises an aqueous urea solution and the exhaust system is configured to inject the DEF into the exhaust flow upstream of a Selective Catalytic Reduction (SCR) module. Subsequently, a reaction between the catalyst of the SCR and the DEF convents NOx components of the exhaust flow to nitrogen and water.

The DEF may be stored in a DEF tank. In cold conditions the DEF within the DEF tank may increase in viscosity, turn slushy or even freeze. To prevent this, it is known to pass heated coolant fluid through a conduit that passes through the DEF tank so as to supply heat energy to the DEF within the DEF tank. In order to prevent over-heating of the DEF in the DEF tank it is important to control the flow of the heated coolant through the DEF tank. To achieve this, it is known to provide a valve, sometimes referred to as a coolant diverter valve (CDV) to control flow of the heated coolant along the conduit.

However, it has been found by the present applicant that such valves may become blocked with debris circulating within the coolant system. This debris may include, for example, particles such as metal particles, rust particles, flakes detached from portions of the engine such as the radiator, casting sand, or foreign bodies entering the coolant system during filling of the coolant fluid from time to time. Blockage of the valve may be a particular issue where the valve is, for example, a 2 way 2 position solenoid valve because such valves comprise orifices and clearances of a small size. In the event that the valve becomes blocked heated coolant may pass continuously through the DEF tank leading to overheating of the DEF which, in turn may result in shut down of the engine to prevent damage or fire risk.

In an attempt to address this problem, use of an in-line filter at the inlet of the valve has been attempted. However, such filters may become blocked and therefore require regular servicing which results in economic costs in terms of labour charges and downtime of the engine. In addition, failure to service the in-line filter may lead to an increase in the pressure drop across the filter as it becomes partially blocked by debris, leading in turn to a reduced flow rate of the coolant fluid, potentially resulting in the DEF tank not being heated sufficiently.

SUMMARY OF THE DISCLOSURE

An embodiment of the present disclosure provides a cooling apparatus for an engine comprising:
 a) a coolant reservoir comprising a coolant line outlet port;
 b) a tank for holding an aqueous urea solution for injection into an exhaust system of the engine;
 c) a coolant line for transferring a coolant fluid discharged from the coolant reservoir via the coolant line outlet port to the tank to enable, in use, heat exchange between the coolant fluid and the aqueous urea solution contained in the tank;
 d) a coolant control valve located on the coolant line for controlling flow of coolant fluid along the coolant line to the tank; and
 e) a filter for filtering the coolant fluid being discharged via the coolant line outlet port;
 wherein the filter comprises a filtering portion that is located within an interior of the coolant reservoir so that the coolant fluid is filtered within the coolant reservoir before the coolant fluid enters the coolant line.

Another embodiment of the present disclosure provides a filter for use in the cooling apparatus of the previous embodiment, the filter comprising a filtering portion that is locatable within an interior of the coolant reservoir so that the coolant fluid is filtered within the coolant reservoir before the coolant fluid enters the coolant line.

Another embodiment of the present disclosure provides a method of protecting a coolant control valve of an engine from contaminants, the method comprising:
 a) using a coolant line to connect the coolant control valve to a coolant line outlet port of a coolant reservoir that contains a coolant fluid;
 b) when the coolant control valve is open, discharging coolant fluid from the coolant reservoir out of the coolant line outlet port and along the coolant line; and
 c) using a filter to filter the coolant fluid before the coolant fluid enters the coolant line by arranging a filtering portion of the filter to be located within an interior of the coolant reservoir so that the filtering portion covers the coolant line outlet port.

BRIEF DESCRIPTION OF THE DRAWINGS

One or more embodiments of the disclosure will now be described, by way of example only, with reference to the accompanying drawings in which.

DETAILED DESCRIPTION

Unless defined otherwise, all technical and scientific terms used in this specification have the same meaning as is commonly understood by the reader skilled in the art to which the claimed subject matter belongs. It is to be understood that the foregoing summary of the disclosure and the following examples are exemplary and explanatory only and are not restrictive of any subject matter claimed.

The following description is directed to embodiments of the disclosure. The description of the embodiments is not meant to include all the possible embodiments of the disclosure that are claimed in the appended claims. Many modifications, improvements and equivalents which are not explicitly recited in the following embodiments may fall within the scope of the appended claims. Features described as part of one embodiment may be combined with features of one or more other embodiments unless the context clearly requires otherwise.

In this specification, the use of the singular includes the plural unless the context clearly dictates otherwise. In this application, the use of "and/or" means "and" and "or" unless stated otherwise.

Figure 1:
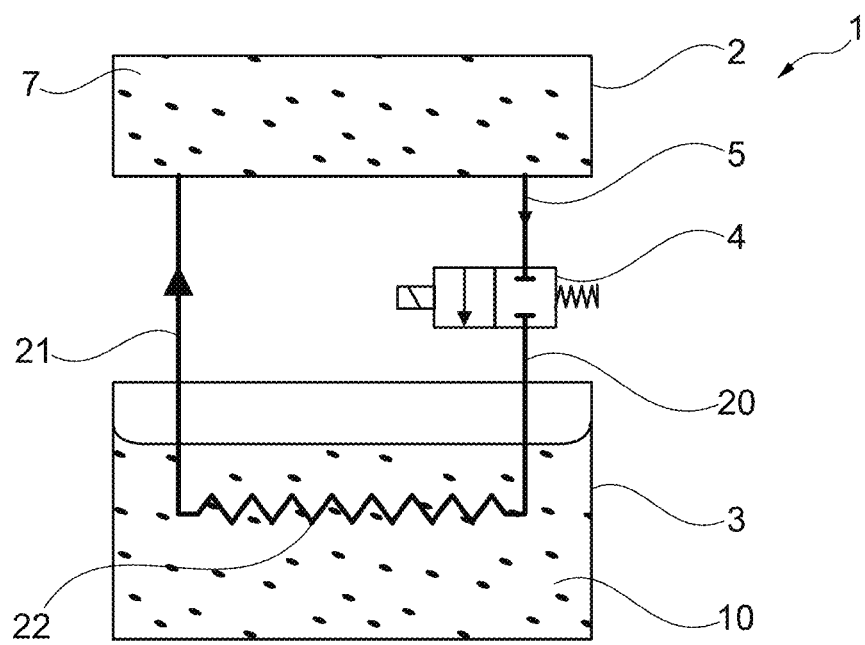
FIG. 1 is a schematic diagram of a cooling apparatus.

The present disclosure relates generally to a cooling apparatus 1 for an engine. FIG. 1 illustrates schematically an example of such a cooling apparatus 1 known in the art.

The cooling apparatus 1 comprises a coolant reservoir 2 comprising a coolant line outlet port 5, a tank 3 for holding an aqueous urea solution 10 for injection into an exhaust system of the engine, a coolant line 20 for transferring a coolant fluid 7 discharged from the coolant reservoir 2 via the coolant line outlet port 5 to the tank 3 to enable, in use, heat exchange between the coolant fluid 7 and the aqueous urea solution 10 contained in the tank 3 and a coolant control valve 4 located on the coolant line 20 for controlling flow of coolant fluid 7 along the coolant line 20 to the tank 3.

The heat exchange may be achieved, for example, by passing the coolant fluid 7, which in use will have been heated by the engine, through an interior of the tank 3 in for example a section of coiled conduit 22 that is supplied by the coolant line 20. The coiled conduit 22 may connect to a coolant return line 21 that may return the coolant fluid 7, directly or indirectly, to the coolant reservoir 2.

Figure 2:
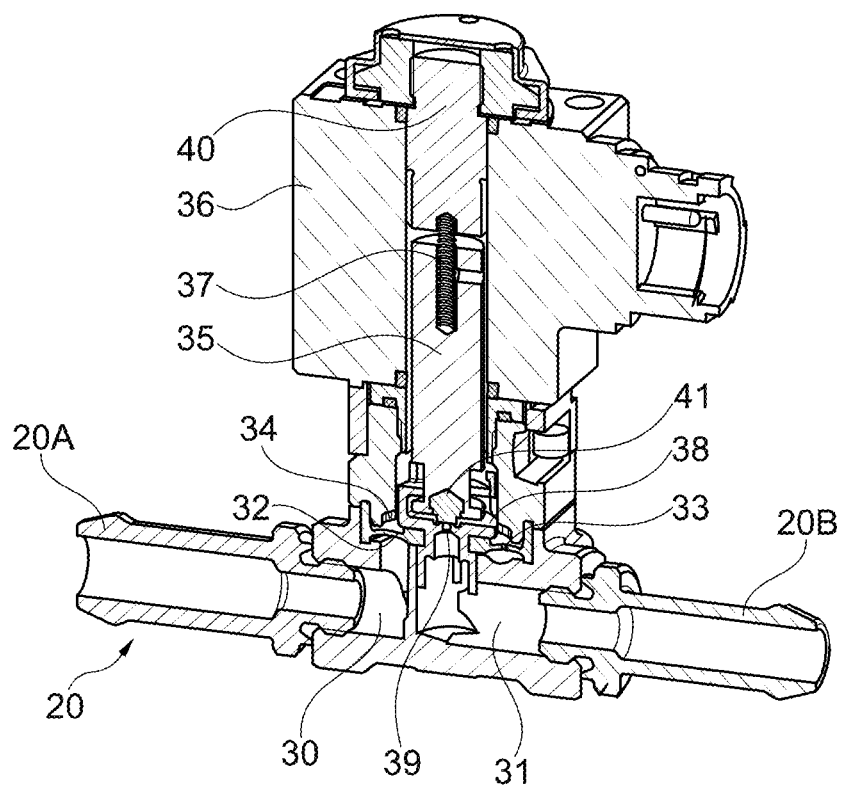
FIG. 2 is a cross-sectional view of a coolant control valve of the cooling apparatus of FIG. 1.
Figure 3:
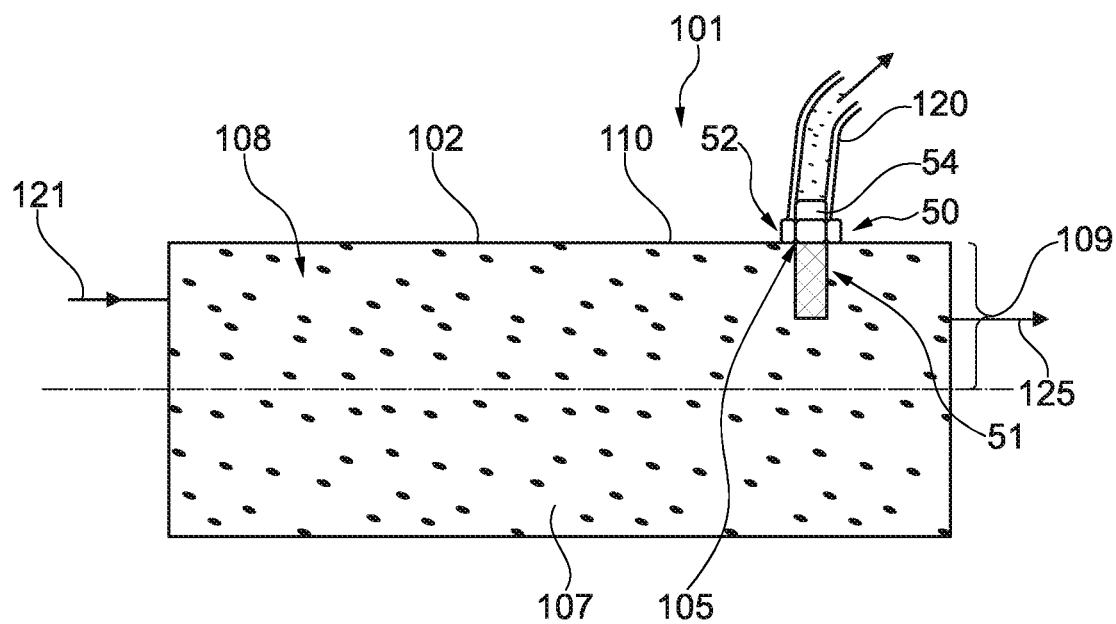
FIG. 3 is a schematic diagram of a coolant reservoir forming a part of a cooling apparatus according to the present disclosure.

It is known to use a solenoid valve as the coolant control valve 4. An example of one such valve is shown, by way of example, in FIG. 2. The illustrated valve is a 2 way 2 position normally closed solenoid valve with assisted lift. An inlet 30 of the valve is connected to an incoming section 20A of the coolant line 20. An outlet 31 of the valve is connected to an outgoing section 20B of the coolant line 20. An armature 35 is located within an electromagnet coil 36 and biased downwards away from a fixed core 40 by a spring 37. A seal 41 is provided at a lower end of the armature 35 for sealing a main orifice 39 of the valve. A shuttle frame 38 is captured on the lower end of the armature 35. The shuttle frame 38 is also engaged with the diaphragm 32 of the valve. The diaphragm 32 defines a pilot chamber 34 above the diaphragm 32. A bleed hole 33 is provided in the diaphragm 32 to permit flow of fluid into the pilot chamber 34 from the inlet 30 when the valve is closed.

When the coil 36 is de-energised the valve is closed by engagement of the seal 41 against the main orifice 39 under action of the fluid pressure in the pilot chamber 34 and the spring 37. When the coil 36 is energised the armature 35 is lifted which in turn assists in lifting the diaphragm 32 due to lifting of the shuttle frame 38 by the armature which in turn lifts the diaphragm 32. The main orifice 39 is thereby lifted and fluid flow is established from the inlet 30 to the outlet 31. The valve can be subsequently closed simply by de-energising the coil 36 again.

Such valves may become blocked with debris circulating within the coolant apparatus 1. In particular because the hole sizes and clearances of the valve are small. For example, the main orifice 39 may be around 1.0 mm in diameter, the bleed hole 33 around 0.8 mm in diameter, and the radial clearance between the armature 35 and the coil 36 around 0.25 mm.

According to the present disclosure, as shown for example in FIGS. 3 to 6, a filter 50 is provided for filtering a coolant fluid 107 being discharged via a coolant line outlet port 105. The filter 50 comprises a filtering portion 51 that is located within an interior 108 of a coolant reservoir 102 so that the coolant fluid 107 is filtered within the coolant reservoir 102 before the coolant fluid 107 enters the coolant line 120. In particular, the coolant fluid 107 may be filtered within an interior of the engine.

The cooling apparatus 101 finds application in particular in cooling apparatus for engines, preferably for diesel internal combustion engines and in particular for diesel internal combustion engines that store DEF in a DEF tank. The coolant reservoir 102 may be, for example, an engine header coolant tank, or a whole or a part of a cylinder block or cylinder head of the engine. In some examples it is preferred that the coolant reservoir 102 is a whole or a part of the cylinder head of the engine.

The coolant line outlet port 105 and the filter 50 may be located in an upper half 109, optionally on an upper surface 110, of the coolant reservoir 102. The filtering portion 51 may be proximate to, and cover, the coolant line outlet port 105.

Figure 5:
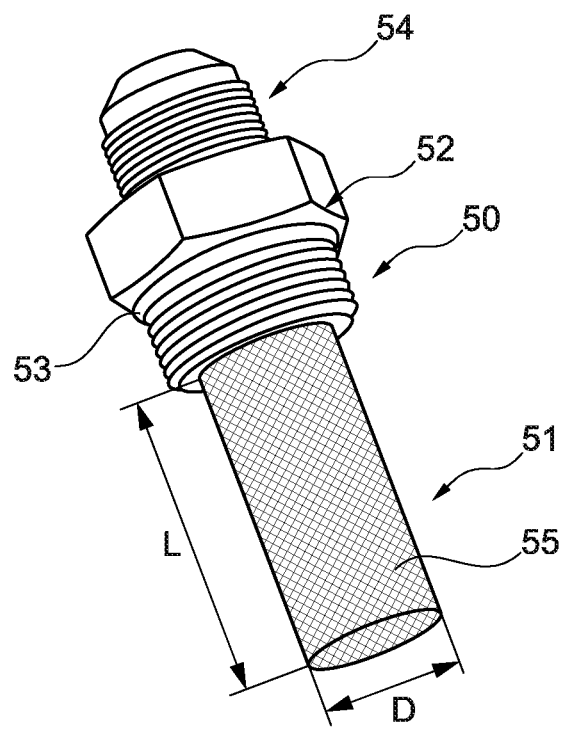
FIG. 5 is a perspective view of a filter according to the present disclosure.
Figure 6:
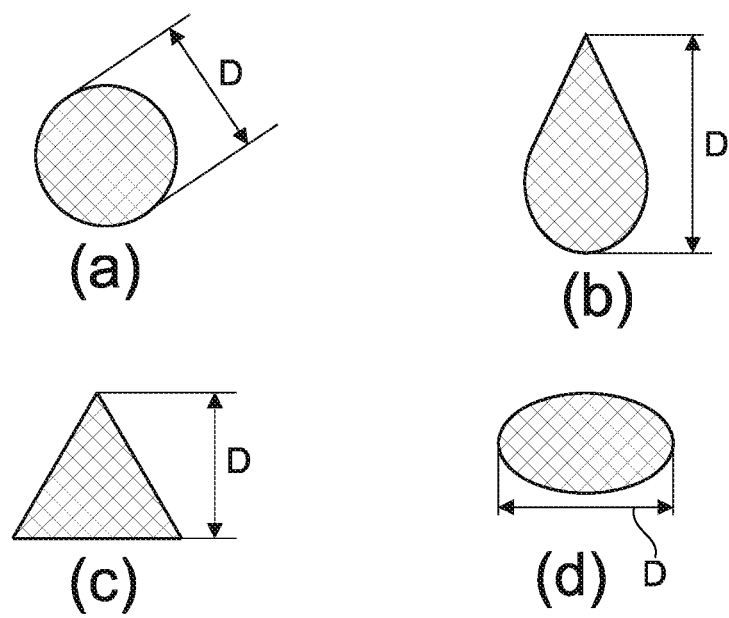
FIG. 6 are schematic views illustrating a variety of cross-sectional shapes of the filter according to the present disclosure.

The filter 50 may further comprise a mounting portion 52 for connecting the filter 50 to the coolant reservoir 102. For example, as shown in FIG. 5, the mounting portion 52 may be configured as a screw fit into the coolant line outlet port 105. The mounting portion 52 may comprise a nut portion for engagement with a spanner. One or more seals 53 may be provided on the coolant line outlet port 105 and/or mounting portion 51 to achieve a fluid-tight connection.

Figure 4:
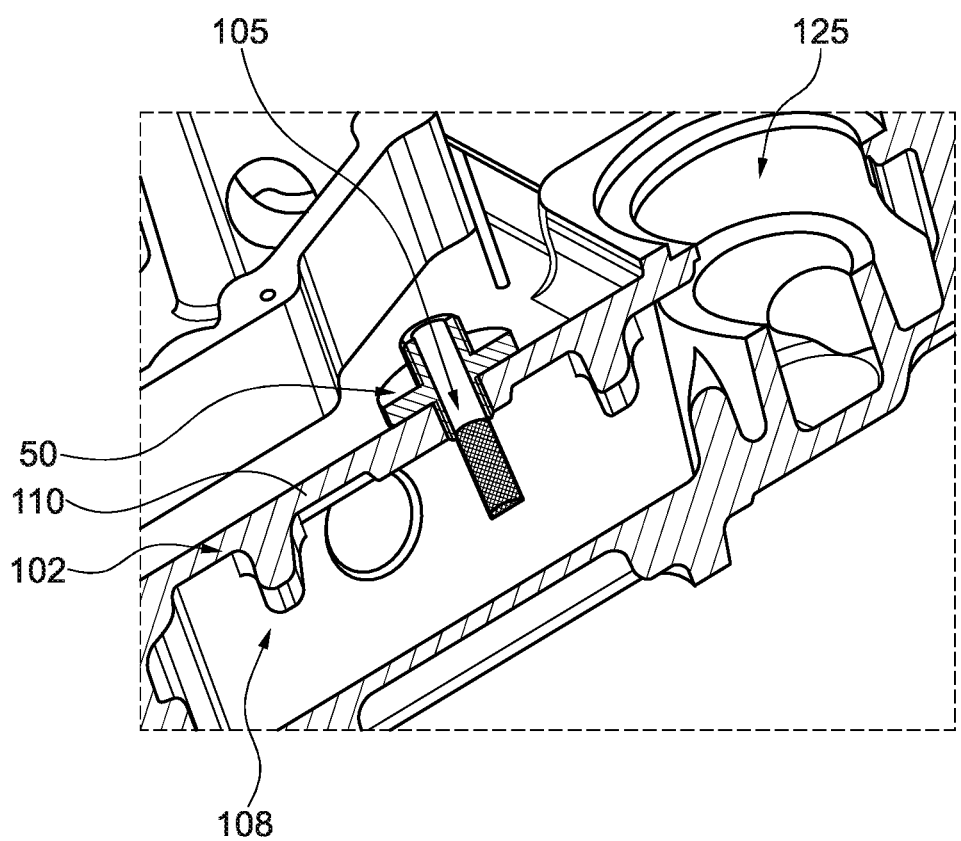
FIG. 4 is a sectional view of a portion of a cooling apparatus according to the present disclosure.

As shown in FIG. 4, the mounting portion 52 may be configured to connect the filter 50 from an exterior of the coolant reservoir 102 such that during mounting of the filter 50 to the coolant reservoir 102 the filtering portion 51 of the filter 50 is inserted through the coolant line outlet port 102 to project into the interior 108 of the coolant reservoir 102.

The filtering portion 51 may extend from a first side of the mounting portion 52 and a coolant line connector 54 may extend from a second, opposite, side of the mounting portion 52. The coolant line connector 54 may be a simple spigot, or a quick connector, or (as illustrated in FIG. 5) may comprise a screw-threaded connection for engaging the coolant line 120.

The ratio L:D of the longitudinal length L of the filtering portion 51 of the filter 50 to a diameter D of the filtering portion 51 may be greater than 2, optionally greater than 2.5. The diameter D may be dimensioned to be marginally less than the internal diameter of the coolant line outlet port 105. For example the coolant line outlet port 105 may have an internal diameter of 19.1 mm (0.75") and the diameter D of the filtering portion 51 may be approximately 18.0 mm to provide sufficient clearance to permit insertion of the filtering portion 51 through the coolant line outlet port 105.

The filtering portion 51 may have an active filtering surface 55 that is at least 5 times, optionally at least 10 times, an open area of the coolant line outlet port 105. Beneficially, his may help to limit the pressure drop across the filter 50 in the event the filter 50 is partially blocked for a limited time period, thus reducing any impact on the flow of the coolant fluid 107.

The filtering portion 51 may comprise or consist of a filtering mesh, and optionally the filtering mesh may have a mesh size of 0.3 to 1.0 mm, optionally 0.6 to 1.0 mm.

The filtering portion 51 may have a cross-sectional shape, perpendicular to a longitudinal axis of the filtering portion 51, selected from: circular, oval, teardrop or triangular as illustrated schematically in FIGS. 6(a) to 6(d). These shapes are designed to help the debris be displaced from the active filtering surface 55, for example by making it easier for the debris to be dislodged by the circulating flow of the coolant fluid 107 as it flows over and around the filtering portion 51. The diameter D of such filtering portions 51 is defined as the longest characteristic dimension perpendicular to the longitudinal axis of the filtering portion 51.

Figure 7:
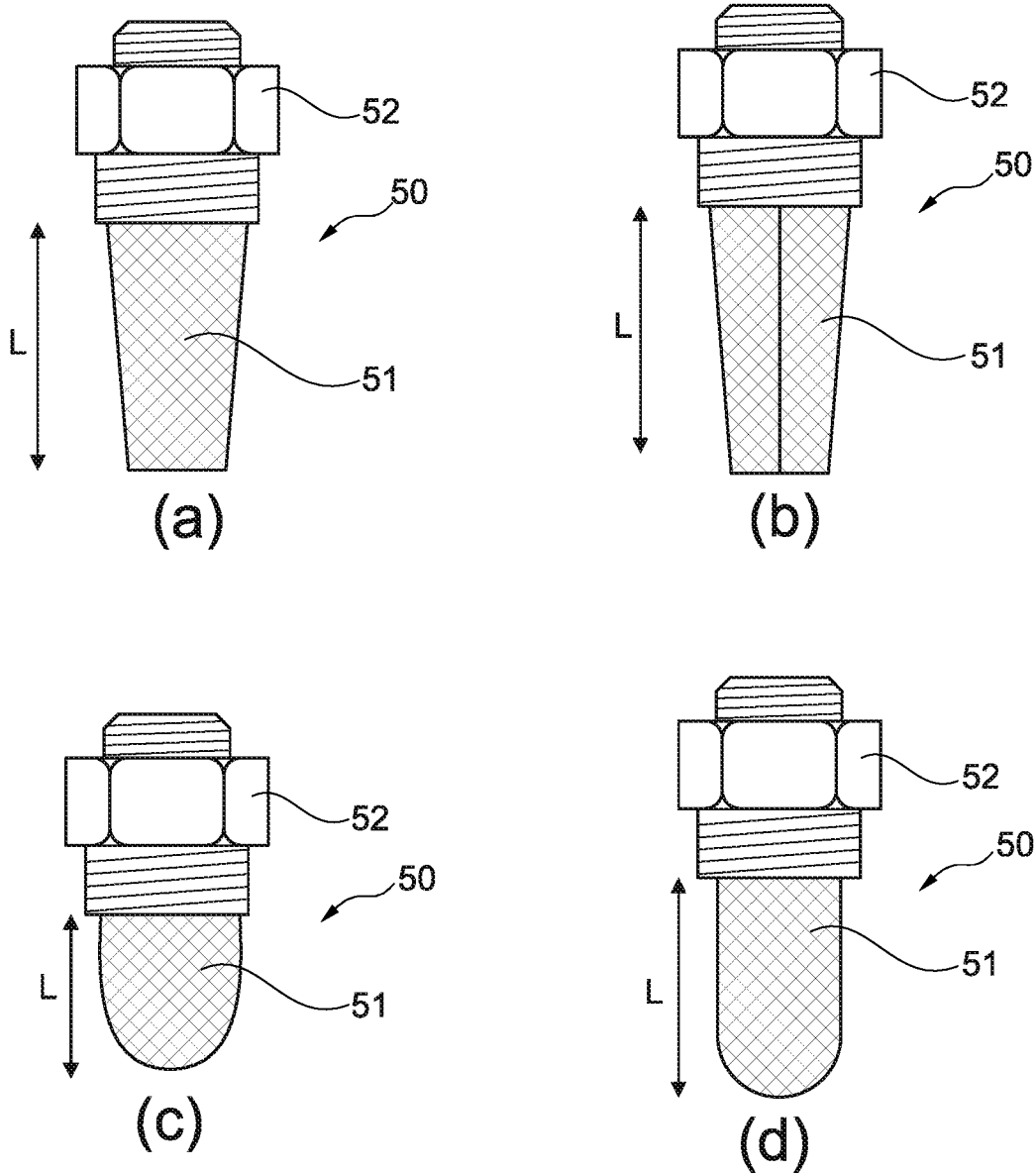
FIG. 7 are schematic views illustrating a variety of external shapes of the filter according to the present disclosure.

The filtering portion 51 may be prismatic along its longitudinal length L, for example as shown in the example of FIG. 5. Alternatively, the filtering portion 51 may taper along its longitudinal length so as to have a decreasing diameter D towards an end distal the mounting portion 52. For example, as shown schematically in FIG. 7 the filtering portion 51 may have a conical or frusto-conical shape (FIG. 7(a)), a pyramidal or frusto-pyramidal shape (FIG. 7(b)) or a domed or part-domed shape (FIG. 7(c)). Differing portions of the filtering portion 51 may have different shapes. As one example, shown in FIG. 7(d), the filtering portion 51 may have a proximal portion that is cylindrical and a distal portion that is hemispherical. These shapes are designed to help the debris to fall or slide down and off the active filtering surface 55 under the action of gravity.

The coolant reservoir 102 may further comprise at least one inlet 121 for coolant fluid and at least one additional outlet port 125 for supplying coolant fluid 107 to other components of the engine. The locations of the at least one inlet 121 and the at least one additional outlet port 125 may be configured to produce a movement of the coolant fluid 107 within the coolant reservoir 102, such that a flow of coolant fluid can be established over and/or around the filtering portion 51 of the filter 50.

In use of the cooling apparatus, the coolant line 120 may be connected to the coolant control valve 4 at one end and to the coolant line outlet port 105 of the coolant reservoir 102 at the other end. When the coolant control valve 4 is open, coolant fluid 107 can be discharged from the coolant reservoir 102 out of the coolant line outlet port 105 and along the coolant line 120, while the filter 50 filters the coolant fluid 107 before the coolant fluid 107 enters the coolant line 120.

INDUSTRIAL APPLICABILITY

The present disclosure provides a cooling apparatus for an engine comprising:
a) a coolant reservoir comprising a coolant line outlet port;
b) a tank for holding an aqueous urea solution for injection into an exhaust system of the engine;
c) a coolant line for transferring a coolant fluid discharged from the coolant reservoir via the coolant line outlet port to the tank to enable, in use, heat exchange between the coolant fluid and the aqueous urea solution contained in the tank;
d) a coolant control valve located on the coolant line for controlling flow of coolant fluid along the coolant line to the tank; and
e) a filter for filtering the coolant fluid being discharged via the coolant line outlet port;
wherein the filter comprises a filtering portion that is located within an interior of the coolant reservoir so that the coolant fluid is filtered within the coolant reservoir before the coolant fluid enters the coolant line.

The cooling apparatus finds application in particular in cooling apparatus for engines, preferably for diesel internal combustion engines and in particular for diesel internal combustion engines that store DEF in a DEF tank.

Providing a filter for filtering the coolant fluid being discharged via the coolant line outlet port, wherein the filter comprises a filtering portion that is located within an interior of the coolant reservoir so that the coolant fluid is filtered within the coolant reservoir before the coolant fluid enters the coolant line, beneficially helps to reduce the risk of blockage of the coolant control valve.

In addition, the requirement for servicing of the filter may be significantly reduced, and in some cases eliminated, since the configuration of the apparatus allows for oversize solid matter trapped by the filtering portion to be washed off the filtering portion within the coolant reservoir such that the filtering portion does not end up being blocked by the solid material. There is therefore less, or no, need to service the filter to replace the filtering portion or clean the filtering portion.

In some embodiments the coolant line outlet port and the filter are located in an upper half, optionally on an upper surface, of the coolant reservoir. Beneficially this can allow the solid material washed off the filtering portion to settle, under the action of gravity, to the bottom of the coolant reservoir and thereby be physically distant from both the coolant line outlet port and the filtering portion of the filter. In addition, another benefit of locating the coolant line outlet port and the filter in the upper half is that less debris will reach the components in the first place as the debris needs to travel upwards against gravity.

In some embodiments the filtering portion is proximate to, and covers, the coolant line outlet port.

In some embodiments the filter further comprises a mounting portion for connecting the filter to the coolant reservoir. For example the mounting portion may be configured as a screw fit into the coolant line outlet port. One or more seals may be provided on the coolant line outlet port and/or mounting portion to achieve a fluid-tight connection.

Beneficially, in some embodiments the mounting portion may be configured to connect the filter from an exterior of the coolant reservoir such that during mounting of the filter to the coolant reservoir the filtering portion of the filter is inserted through the coolant line outlet port to project into the interior of the coolant reservoir. This allows for easier installation of the filter (and removal if ever required), since the interior volume of the coolant reservoir may not be easily accessible, especially after commissioning of the engine.

In some embodiments the filtering portion extends from a first side of the mounting portion and a coolant line connector extends from a second, opposite, side of the mounting portion. Beneficially, the filter can provide both the filtering function and also the means of connection to the coolant line in one component.

In some embodiments the ratio of a longitudinal length of the filtering portion of the filter to a diameter of the filtering portion is greater than 2 optionally greater than 2.5. Beneficially, the size and length to diameter ratio can be configured to provide a relatively large active filtering surface compared to a filter that is provided in-line within a conduit. This reduces the risk of total blockage of the active filtering surface and also reduces the amount of pressure loss across the filter. For example, in some embodiments the filtering portion has an active filtering surface that is at least 5 times, optionally at least 10 times, an open area of the coolant line outlet port. Thus, the additional pressure loss due to the presence of the filter can be kept very small and much smaller compared to use of a filter that is provided in-line within a conduit.

In some embodiments the filtering portion comprises a filtering mesh, and optionally the filtering mesh has a mesh size of 0.3 to 1.0 mm, optionally 0.6 to 1.0 mm. Beneficially, since the filter is primarily contemplated for use for filtering a coolant fluid, the mesh size can be kept reasonably coarse. This also beneficially helps to reduce any pressure loss across the filter.

In some embodiments the filtering portion has a cross-sectional shape selected from: circular, oval, teardrop or triangular. Beneficially, such shaping of the filtering portion can aid the washing off of the oversize solid material from the filtering portion under the action of the passing flow of coolant fluid within the coolant reservoir.

In some embodiments the coolant reservoir further comprises at least one inlet for coolant fluid and at least one additional outlet port for supplying coolant fluid to other components of the engine.

In some embodiments the locations of the at least one inlet for coolant fluid and the at least one additional outlet port are configured to produce a movement of the coolant fluid within the coolant reservoir, such that a flow of coolant fluid can be established over and/or around the filtering portion of the filter to wash off oversize solid matter trapped by the filtering portion, even when the coolant control valve is shut and no coolant fluid is being discharged via the coolant line outlet port. Beneficially the washing action of the flow of coolant fluid over and/or around the filtering portion can help to reduce, or at least slow, the build-up of oversize solid material that is trapped by the filtering portion. This can lengthen the service interval for the filter or, in some cases, can eliminate a service requirement for the filter.

The cooling apparatus finds application in particular where the coolant control valve is a diesel exhaust fluid (DEF) valve, sometimes referred to as a Coolant Diverter Valve (CDV). The coolant control valve may be, for example, a solenoid valve, optionally a 2 way 2 position solenoid valve, optionally a normally closed solenoid valve, optionally a pilot-operated solenoid valve.

The filter may be located within an interior of the engine. The cooling apparatus finds application in particular where the coolant reservoir is an engine header coolant tank, or the coolant reservoir is a whole or is part of the cylinder block or cylinder head of the engine.

The present disclosure also provides a filter for use in the cooling apparatus, the filter comprising a filtering portion that is locatable within an interior of the coolant reservoir so that the coolant fluid is filtered within the coolant reservoir before the coolant fluid enters the coolant line.

The use and benefits of the filter may be as discussed above with reference to the cooling apparatus.

The present disclosure also provides a method of protecting a coolant control valve of an engine from contaminants, the method comprising:
a) using a coolant line to connect the coolant control valve to a coolant line outlet port of a coolant reservoir that contains a coolant fluid;
b) when the coolant control valve is open, discharging coolant fluid from the coolant reservoir out of the coolant line outlet port and along the coolant line; and
c) using a filter to filter the coolant fluid before the coolant fluid enters the coolant line by arranging a filtering portion of the filter to be located within an interior of the coolant reservoir so that the filtering portion covers the coolant line outlet port.

In some embodiments the filter is located in an upper half, optionally on an upper surface, of the coolant reservoir.

In some embodiments the method further comprising creating a movement of the coolant fluid within the coolant reservoir, such that a flow of coolant fluid is established over and/or around the filtering portion of the filter, thereby washing off oversize solid matter trapped by the filtering portion, even when the coolant control valve is shut and no coolant fluid is being discharged via the coolant line outlet port.

In some embodiments the coolant control valve is a diesel exhaust fluid (DEF) valve for controlling flow of the coolant fluid to a tank holding an aqueous urea solution for injection into an exhaust system of the engine.

The present applicant has found from testing that without a filter a Coolant Diverter Valve (CDV) used for controlling flow to a DEF tank may fail within a service period of as little as 250 hours in some situations. From examination of the failed CDVs, the failure modes have been observed to include the presence of single or multiple debris particles on the valve seat causing the CDV to stick open. Use of the filter of the present application has been found to substantially reduce the failure rate of the CDVs and increase the expected service period of the CDV before failure to over 8,000 hours or more. In addition, the self-cleaning nature of the filter—due to its configuration and location—reduces and potentially eliminates the need for any servicing of the filter itself during the 8,000 hour or more period of service of the CDV.

It is to be understood that at least some of the figures and descriptions of the disclosure have been simplified to focus on elements that are relevant for a clear understanding of the disclosure, while eliminating, for purposes of clarity, other elements that the reader skilled in the art will appreciate may also be required. Because such elements are well known to the reader skilled in the art, and because they do not necessarily facilitate a better understanding of the disclosure, a description of such elements is not provided herein.

What is claimed is:
1. A cooling apparatus for an engine comprising:
a) a coolant reservoir comprising a coolant line outlet port;
b) a tank for holding an aqueous urea solution for injection into an exhaust system of the engine;
c) a coolant line for transferring a coolant fluid discharged from the coolant reservoir via the coolant line outlet port to the tank to enable, in use, heat exchange between the coolant fluid and the aqueous urea solution contained in the tank;
d) a coolant control valve located on the coolant line for controlling flow of coolant fluid along the coolant line to the tank; and
e) a filter for filtering the coolant fluid being discharged via the coolant line outlet port;
wherein the filter comprises a filtering portion that is located within an interior of the coolant reservoir so that the coolant fluid is filtered within the coolant reservoir before the coolant fluid enters the coolant line; and
wherein the coolant reservoir is a portion of a cylinder head and the filtering portion is located within an interior of the cylinder head.

2. The cooling apparatus of claim 1, wherein the coolant line outlet port and the filter are located in an upper half of the coolant reservoir.

3. The cooling apparatus of claim 1, wherein the filter further comprises a mounting portion for connecting the filter to the coolant reservoir, and the mounting portion is configured to connect the filter from an exterior of the coolant reservoir such that during mounting of the filter to the coolant reservoir the filtering portion of the filter is inserted through the coolant line outlet port to project into the interior of the coolant reservoir.

4. The cooling apparatus of claim 1, wherein the coolant reservoir is a whole of the cylinder head and the filtering portion is located within an interior of the cylinder head.

5. The cooling apparatus of claim 1, wherein the filtering portion has a cross-sectional shape selected from: circular, oval, teardrop or triangular.

6. The cooling apparatus of claim 1, wherein the filtering portion has an active filtering surface that is at least 5 times the size and length to diameter ratio of an open area of the coolant line outlet port.

7. The cooling apparatus of claim 1, wherein the coolant reservoir further comprises at least one inlet for coolant fluid and at least one additional outlet port for supplying coolant fluid to other components of the engine.

8. The cooling apparatus of claim 7, wherein the locations of the at least one inlet for coolant fluid and the at least one additional outlet port are configured to produce a movement of the coolant fluid within the coolant reservoir, such that a flow of coolant fluid can be established over and/or around the filtering portion of the filter to wash off oversize solid matter trapped by the filtering portion, even when the coolant control valve is shut and no coolant fluid is being discharged via the coolant line outlet port.

9. The cooling apparatus of claim 1, wherein the filter comprises the filtering portion that is locatable within the interior of the coolant reservoir so that the coolant fluid is filtered within the coolant reservoir before the coolant fluid enters the coolant line.

10. The cooling apparatus of claim 9, wherein the filter further comprises a mounting portion for connecting the filter to the coolant reservoir, and the filtering portion extends from a first side of the mounting portion and a coolant line connector extends from a second, opposite, side of the mounting portion.

11. The cooling apparatus of claim 9, wherein the filtering portion has a cross-sectional shape selected from: circular, oval, teardrop or triangular.

12. The cooling apparatus of claim 9, wherein the filtering portion comprises a filtering mesh, and the filtering mesh has a mesh size of 0.3 to 1.0 mm.

13. The cooling apparatus of claim 9, wherein the filtering portion comprises a filtering mesh, and the filtering mesh has a mesh size of 0.6 to 1.0 mm.

14. The cooling apparatus of claim 1, wherein the coolant line outlet port and the filter are located in an upper half, on an upper surface, of the coolant reservoir.

15. The cooling apparatus of claim 1, wherein the filtering portion has an active filtering surface that is at least 10 times a size and length to diameter ratio of an open area of the coolant line outlet port.

16. A method of protecting a coolant control valve of an engine from contaminants, the method comprising:
 a) using a coolant line to connect the coolant control valve to a coolant line outlet port of a coolant reservoir that contains a coolant fluid;
 b) when the coolant control valve is open, discharging coolant fluid from the coolant reservoir out of the coolant line outlet port and along the coolant line; and
 c) using a filter to filter the coolant fluid before the coolant fluid enters the coolant line by arranging a filtering portion of the filter to be located within an interior of the coolant reservoir so that the filtering portion covers the coolant line outlet port, wherein the coolant reservoir is a portion of a cylinder head and the filtering portion is located within an interior of the cylinder head.

17. The method of claim 16, wherein the filter is located in an upper half of the coolant reservoir.

18. The method of claim 16, the method further comprising creating a movement of the coolant fluid within the coolant reservoir, such that a flow of coolant fluid is established over and/or around the filtering portion of the filter, thereby washing off oversize solid matter trapped by the filtering portion, even when the coolant control valve is shut and no coolant fluid is being discharged via the coolant line outlet port.

19. The method of claim 16, wherein the coolant control valve is a diesel exhaust fluid (DEF) valve for controlling flow of the coolant fluid to a tank holding an aqueous urea solution for injection into an exhaust system of the engine.

20. The method of claim 16, wherein the filter is located in an upper half on an upper surface of the coolant reservoir.

* * * * *